United States Patent [19]
Benting et al.

[11] Patent Number: 5,464,236
[45] Date of Patent: Nov. 7, 1995

[54] PORTABLE MUSICAL INSTRUMENTS CART

[75] Inventors: Gary M. Benting; Leslie R. Abraham, both of Owatonna, Minn.

[73] Assignee: Wenger Corporation, Owatonna, Minn.

[21] Appl. No.: 289,400

[22] Filed: Aug. 12, 1994

[51] Int. Cl.$^6$ ................................ B60F 5/00; B62B 3/02
[52] U.S. Cl. ................ 280/30; 280/651; 280/47.35; 280/79.3; 108/63
[58] Field of Search ................ 280/30, 651, 47.35, 280/79.3; 108/63, 167, 173

[56] References Cited

U.S. PATENT DOCUMENTS

| | | | |
|---|---|---|---|
| 898,778 | 9/1908 | Phelan | 108/63 X |
| 1,171,343 | 2/1916 | Klok | 280/79.3 |
| 1,654,330 | 12/1927 | Jenkins | 108/63 X |
| 2,409,348 | 10/1946 | Evans | 280/47.35 X |
| 2,603,500 | 7/1952 | Messier | 280/30 |
| 2,852,325 | 9/1958 | Fosnaugh | 108/63 |
| 3,722,700 | 3/1973 | Cummings | 280/79.3 X |
| 3,873,114 | 3/1975 | Brown | 280/30 |

*Primary Examiner*—Brian L. Johnson
*Attorney, Agent, or Firm*—Patterson & Keough

[57] ABSTRACT

A portable musical instrument support for storage, transport, and performance support of musical instruments. The portable musical instruments cart provides for the efficient setup, breakdown, storage and transport of a multiplicity of musical instruments, and is especially adapted for the storage and support of ORFF instruments. The portable musical instruments cart includes a base frame supported by a floor engaging wheel assembly, a pair of fixed shelf surfaces, and first and second expandable shelf assemblies. The base frame includes opposed upright standards of uneven height, and the first and second expandable shelf assemblies are pivotally coupled to respective ones of the upright standards. The expandable shelf assemblies each include a generally U-shaped support leg that supports a respective shelf assembly when in the expanded position, and which provides a hand graspable handle for maneuvering the portable instrument cart when in the folded position.

6 Claims, 5 Drawing Sheets

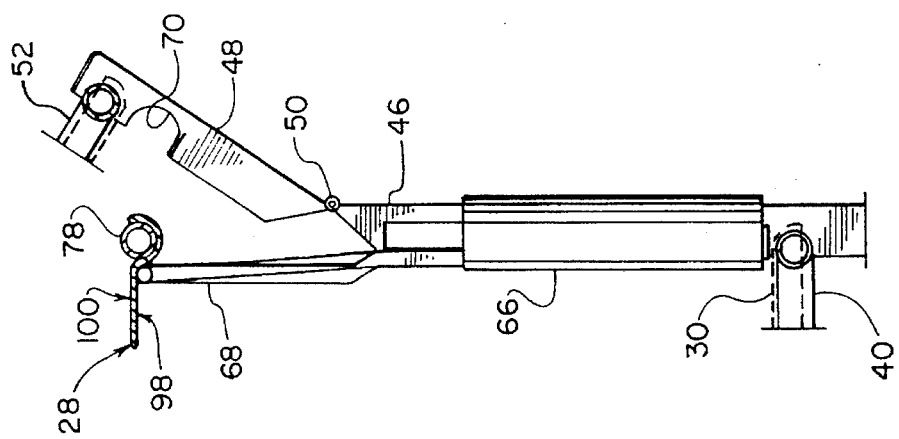
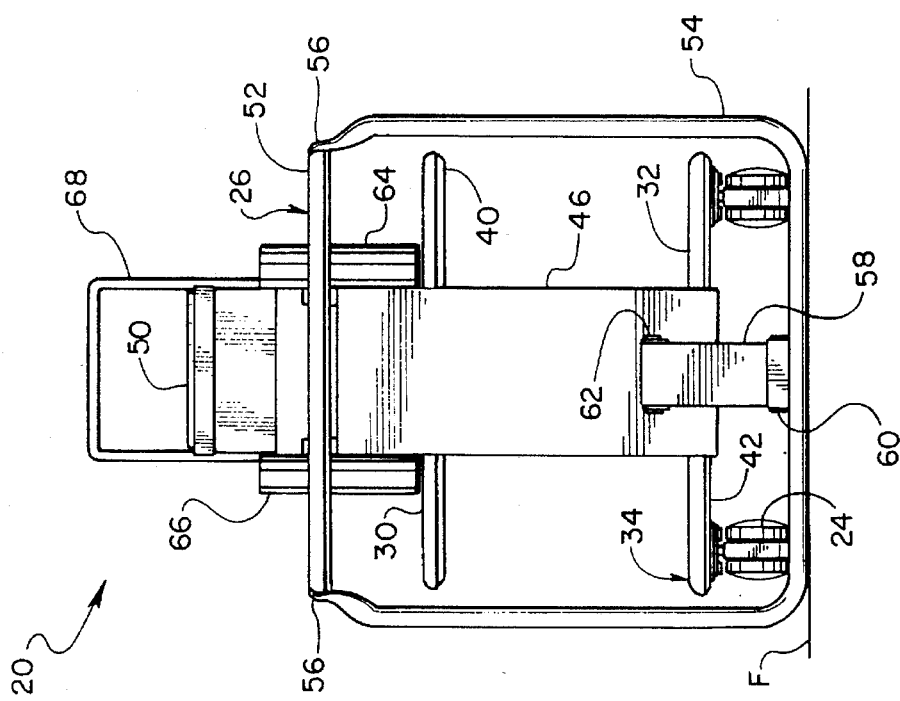

PORTABLE MUSICAL INSTRUMENTS CART

FIELD OF THE INVENTION

This invention relates to musical instrument support stands and storage devices. More particularly, the invention relates to a mobile cart for use in the storage and transport of a multiplicity of percussion instruments, and for support of the instruments in a performing position.

BACKGROUND OF THE INVENTION

Musical instruments are generally items of personal possession and do not require carts for support or transport. A musician owns the instrument and is the sole user of the instrument, carrying it from home to performance as needed. However, in many circumstances, particularly those found in institutions of education and music there are a number of instruments that are used by a multiplicity of musicians and students that are not intended to be solely possessed and used by one musician. A well-known example of these types of instruments are those instruments collectively known as ORFF instruments.

The twentieth century German composer Carl Orff contributed to music education for the young through a method that combines music with motion. His system for musical education is largely based on developing a sense of rhythm in the students through group exercise and performance with percussion instruments. Carl Orff's method of instruction and education has enjoyed considerable acceptance and has been widely adopted into musical education programs.

The ORFF method of developing rhythm uses a multiplicity of simple percussion instruments played by a group of students simultaneously. In order to accomplish this method, the multiplicity of instruments are set up and arranged for the group to use. This set up can occupy considerable space. Many institutions are cramped for useable space and are in the unenviable position of setting up and breaking down these instruments in an ongoing daily schedule as the needs for the space and facilities changes.

Furthermore, when these instruments are not in use, and because the instruments are not owned individually, the ORFF instruments require appropriate storage. Consequently, ORFF instruments need to be brought from storage, set up for a lesson or a performance, and then returned to storage. Alternatively, the ORFF instruments are set up and, due to the inconvenience of transporting the instruments back and forth, they are left set up, necessitating that music program directors and students work around the ORFF instruments when not in actual use. A mobile instrument cart that could provide storage, set up, and transport for a collection of ORFF instruments would provide decided advantages over the current circumstances under which ORFF instruments are used.

SUMMARY OF THE INVENTION

The problems outlined above are in large measure solved by the portable musical instruments cart in accordance with the present invention the portable musical instruments cart is especially adapted for the convenient storage, setup, and transport of musical instruments, and of ORFF musical instruments in particular.

The portable musical instruments cart includes a base frame supported by a floor engaging wheel assembly, a pair of fixed shelf surfaces, and first and second expandable shelf assemblies. The base frame includes a pair of opposed upright standards positioned on opposite ends of the base frame, and with one standard being higher than the other. Each of the expandable shelf assemblies are pivotally coupled to a respective upright standard, and are shiftable between a folded configuration for transport and storage of the cart, and an expanded, performance position for supporting instruments during playing of the instruments by a student or musician. When in the folded position, the first expandable shelf assembly overlaps the second expandable shelf assembly. Each of the shelf assemblies includes a generally U-shaped support leg that, when in the expanded position, supports the shelf assembly. When in the folded position, the generally U-shaped support legs present a hand graspable handle for maneuvering a cart.

BRIEF DESCRIPTION OF THE DRAWINGS

FIG. 4 is a side elevational view of the portable instrument cart in the expanded, performance position;

FIG. 6 is a fragmentary, enlarged front elevational view of the portable instrument cart depicting a hinged attachment useful in changing the cart from a folded storage to an expanded performance position.

DETAILED DESCRIPTION OF THE DRAWINGS

Figure 1:
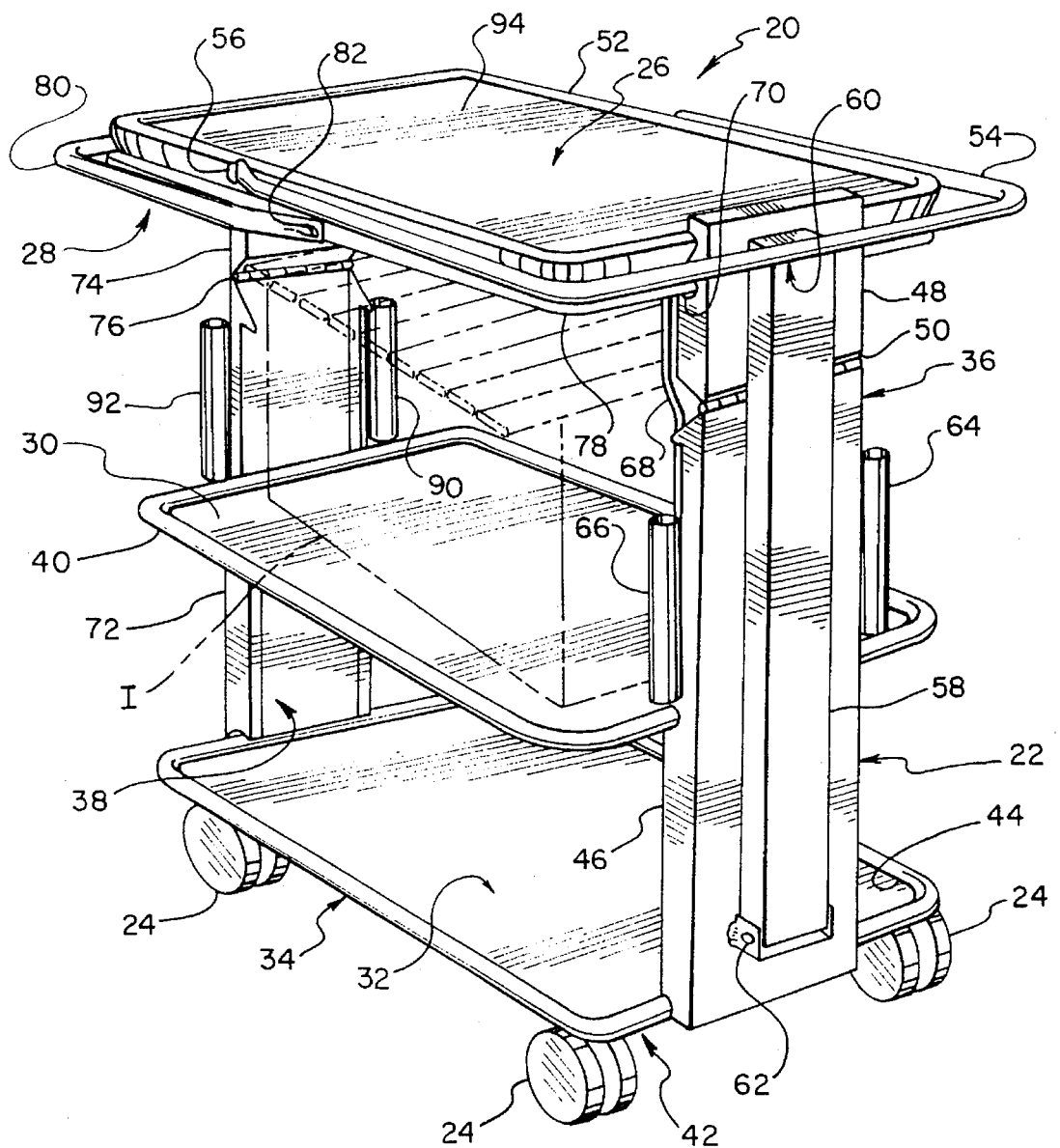
FIG. 1 is a perspective view of the portable instrument cart in accordance with the present invention depicted in the folded storage position, with phantom lines depicting an ORFF instrument positioned thereon.

Referring to the drawings, where like numbers indicate like elements throughout the several drawings, a portable cart 20, in accordance with the present invention broadly includes a frame 22, wheel assemblies 24, an upper expandable shelf assembly 26, a lower expandable shelf assembly 28, an upper fixed shelf 30, and a lower fixed shelf 32.

Frame 22 includes a base frame 34, rigidly connected between an upright high end frame 36 and an upright low end frame 38, and an upper support frame 40 vertically displaced above and parallel to the base frame 34, and rigidly connected between end frames 36, 38. Base frame 34 includes a wheel assembly engagement surface 42 to which wheel assemblies 24 are attached, and a lower, generally tubular fixed shelf engagement perimeter rim 44 supporting lower fixed shelf 32.

High end frame 36 includes a high vertical standard 46 fixedly attached at its lower end to base frame 34, a vertical standard extender 48 hingedly connected to standard 46 at a hinge 50, an upper expandable shelf tubular support rim 52 fixedly attached to extender 48, a generally U-shaped upper expandable shelf support leg 54 pivotally connected to tubular support rim 2 at pivot pins 56, a tie bar 58 attached at one end to support leg 54 with an outer hinge 60 and attached to vertical standard 46 at a lower hinge 62. The structure including vertical standard 46, standard extender 48, tubular support 52, support leg 54, and tie bar 58 forms an equivalent four bar mechanism.

Vertical standard 46 includes mallet holders 64, 66, and a lower expandable shelf support frame 68. Standard extender 48 includes a lower expandable shelf receiving relief notch 70.

Low end frame 38 includes a low vertical standard 72 fixedly attached at its lower end to base frame 34, a low vertical standard extender 74 hingedly connected to vertical standard 72 by a hinge 76, a lower expandable shelf tubular support rim 78 fixedly attached to standard extender 74, a generally U-shaped lower expandable shelf support leg 80 pivotally attached to tubular support rim 78 by pivot pins 82, a tie bar 84 hingedly connected to support leg 80 at an outer hinge 86 and hingedly attached to vertical standard 72 at a lower hinge 88. The structural combination of vertical standard 72, standard extender 74, support leg 80 and tie bar 84 forms an equivalent four bar mechanism. Additionally, vertical standard 72 includes mallet holders 90, 92.

Upper expandable shelf 26 comprises a folded storage surface 94 and an expanded performance surface 96. Lower expandable shelf 28 comprises an expandable performance surface 98 and a folded storage surface 100.

Figure 2:
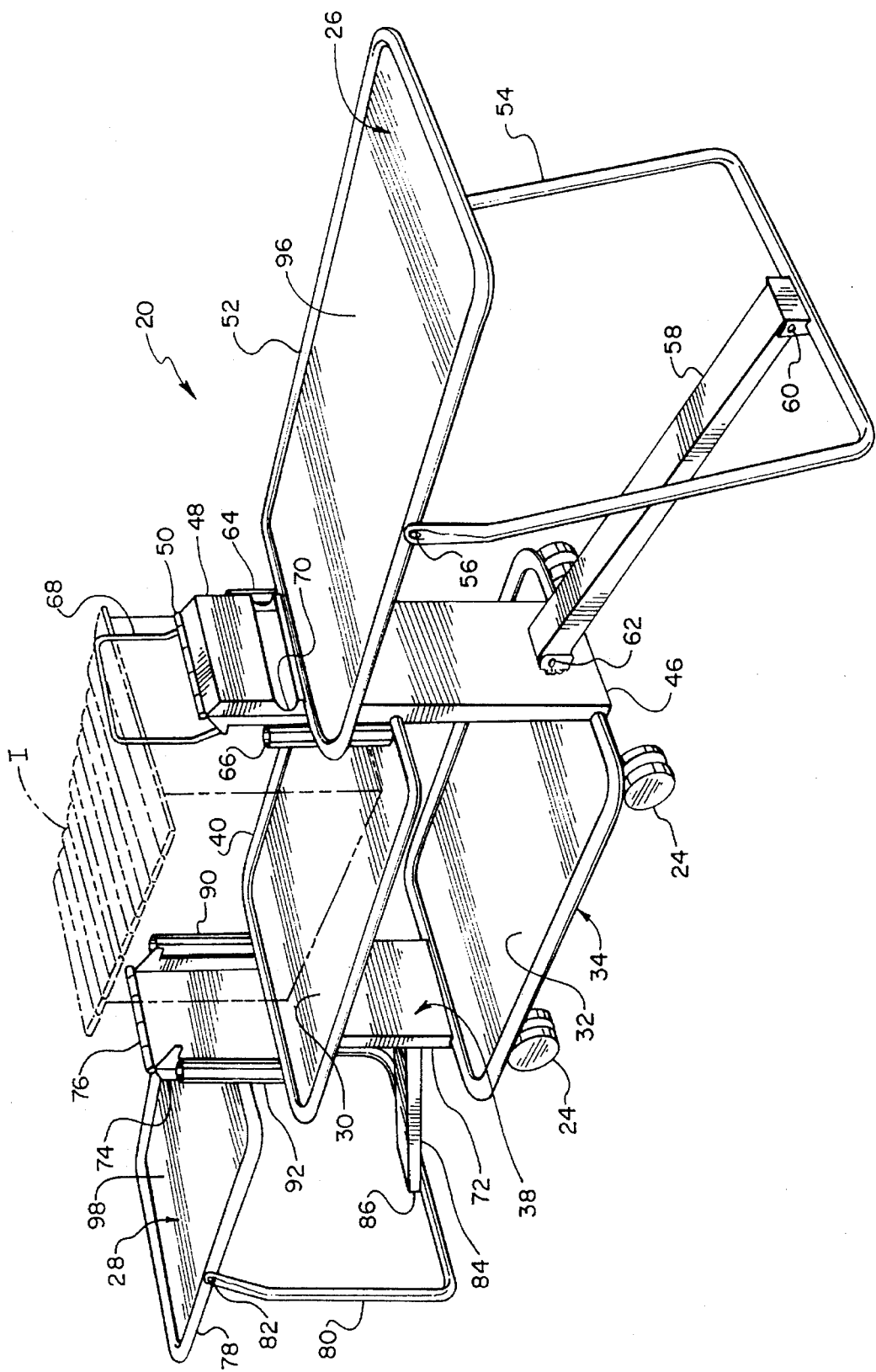
FIG. 2 is a perspective view of the portable instrument cart of in FIG. 1, but depicted in an expanded performance position.
Figure 3:
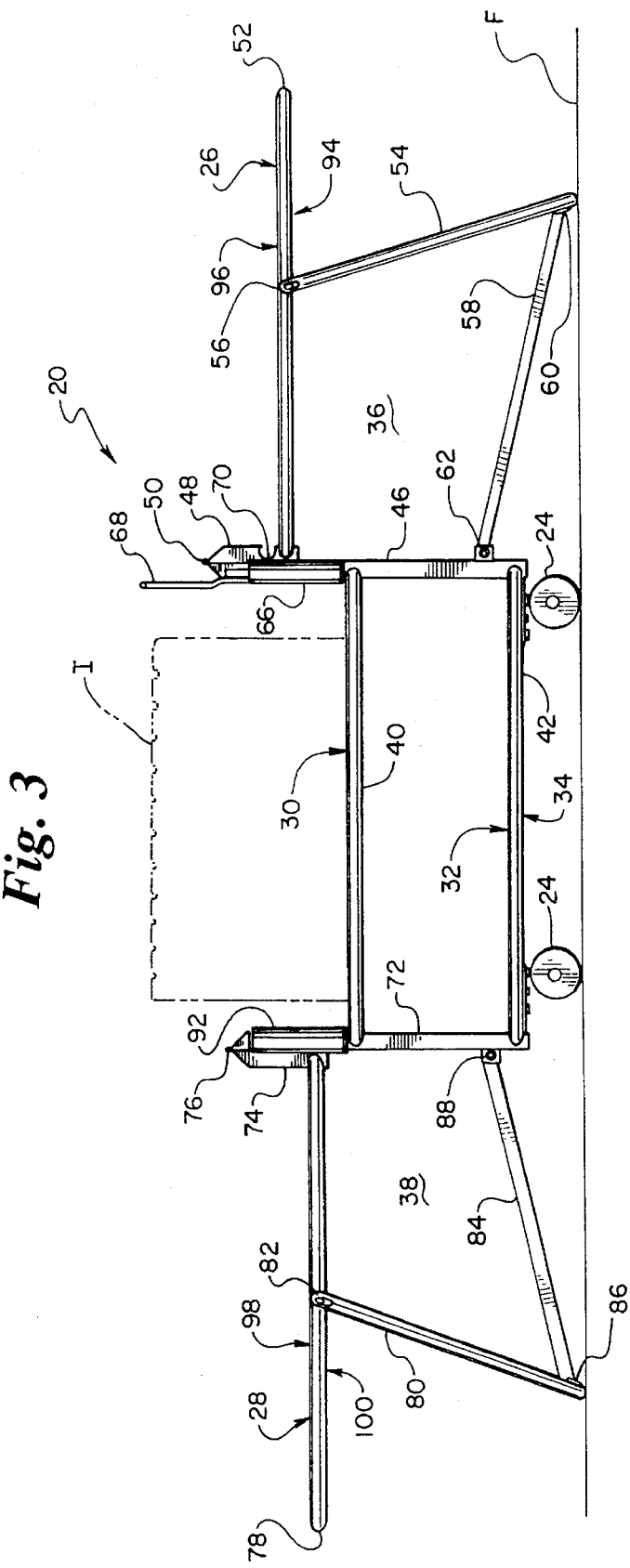
FIG. 3 is a front elevational view of the portable instrument cart in the expanded, performance position, with phantom lines depicting an ORFF instrument positioned thereon.
Figure 5:
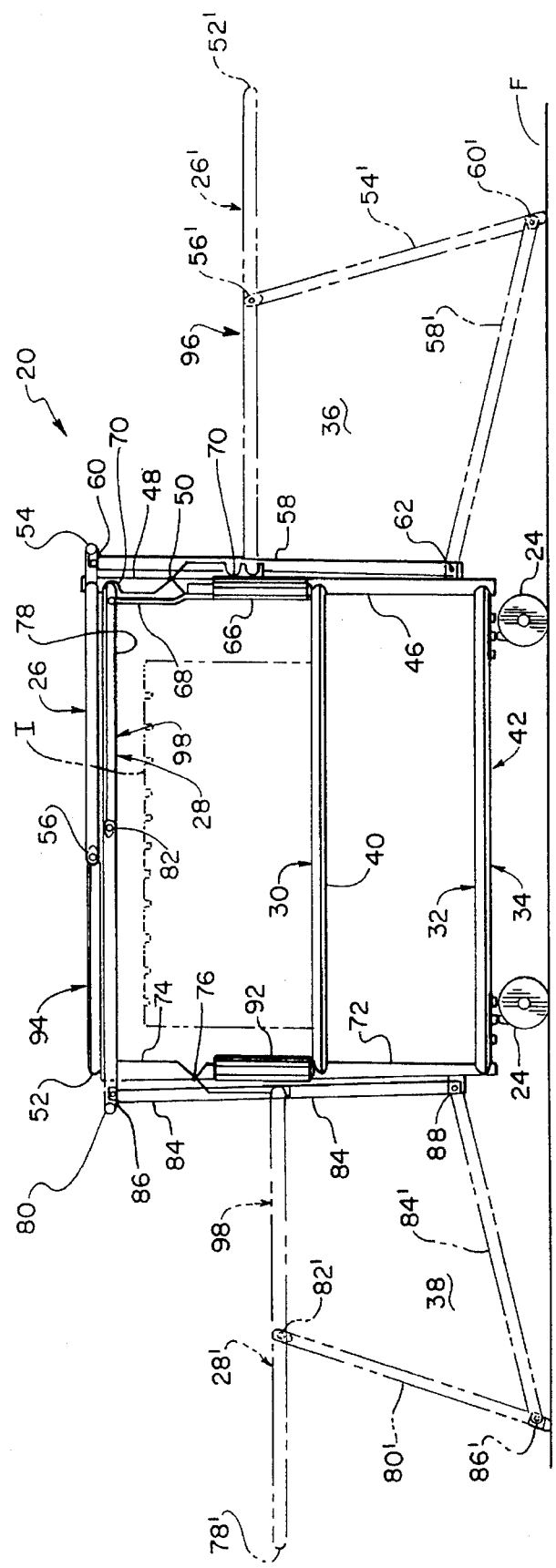
FIG. 5 is a front elevational view of a portable instrument cart depicted in the folded storage position, with the phantom lines depicted in the cart in the expanded performance position.

In operation, portable cart 20 is changeable from a folded storage and transport configuration as depicted in FIGS. 1 and 5, to an expanded non-mobile performance configuration as depicted in FIGS. 2, 3, and 4, and shown in phantom in FIG. 5. The conformational distinction between the folded storage configuration and the expanded performance configuration is characterized by an understanding of the equivalent four bar mechanisms, described above, that are inherent in high end frame 36 and low end frame 38.

Portable cart 20, as depicted in FIG. 1, has upper expandable shelf 26, and lower expandable shelf 28 in the folded configuration such that folded storage surface 94 of expandable shelf 26 is the upper-most presenting surface of portable cart 20. Referring to FIG. 5, just below upper expandable shelf 26 (again, with the cart 20 in the folded configuration) is the lower expandable shelf 28. As depicted in FIG. 5 the expandable shelf 28 is resting at its free end on lower expandable shelf support frame 68 and the performance surface 98 is facing downwardly.

Additionally, in the folded storage transport configuration, cart 20 presents support leg 54 and support leg 80 as convenient handles for an operator to hold onto and either push, pull, or steer portable cart 20 across a floor surface F. The folded configuration of portable cart 20 provides three shelf surfaces; folded storage surface 94, upper fixed shelf 30, and lower fixed shelf 32 upon which can be arranged a multiplicity of ORFF instruments for transport (a single ORFF instrument I being depicted in phantom lines in the drawings).

To prepare portable cart 20 for its performance configuration, portable cart 20 may be wheeled to the performance area and brought into position on caster wheel assemblies 24. Any ORFF instruments stored on surface 94 are then removed temporarily.

To begin the expansion of cart 20, an operator next takes hold of upper expandable shelf tubular support 52 and begins lifting at its end opposite vertical standard extender 48. This lifting of tubular support 52 imparts motion to the equivalent four bar mechanism described above. An intermediate position is depicted in FIG. 6 where standard extender 48 has pivoted at hinge 50 in relation to vertical standard 46 withdrawing extender 48 and relief notch 70 away from lower expandable shelf tubular support 78 which remains resting on lower expandable shelf support frame 68. This lifting motion is continued until upper expandable shelf tubular support 52 is rotated and brought to its full expanded position, depicted in FIG. 5 as tubular support 52'.

Support leg 54, which had been useful as a handle for the operator to push the cart with in the folded position, now provides support to shelf tubular support 52, extending as a support leg between horizontally positioned extended tubular support 52' and floor F as support leg 54', depicted in FIG. 5. During this motion, from folded to expanded positioning, tie bar 58 has rotated from its nearly vertical position to a nearly horizontal position as depicted by tie bar 58' in FIG. 5.

Rotating tubular support 52 into an expanded horizontal position brings upper expandable shelf 26 into its performance position as shown by expandable shelf 26' in FIG. 5. The expanded position of expandable shelf 26 now presents expanded performance surface 96 as the upper most surface of expandable shelf 26. ORFF instruments may now be arranged on performance surface 96 in preparation for a group performance.

Expansion of lower expandable shelf 28 may now be undertaken. A similar mode of operation as described above for expandable shelf 26 is instituted for expandable shelf 28. An operator would first lift tubular support 78 at its free end raising tubular support 78 and expandable shelf 28 up from its folded resting position on lower expandable shelf support frame 68. As tubular support frame 78 is rotated through its arc as defined by hinge 76, shelf support leg 80 is brought from its folded handle equivalent position to its extended support leg position as depicted by moving from its position as shelf support leg 80 to shelf support leg 80', depicted in FIG. 5. As noted above, with rotation of shelf tubular support 78 from its folded position to tubular support 78', lower expandable shelf 28 switches from presenting folded storage surface 100 to presenting expanded performance surface 98 as the upper most surface for lower expandable shelf 28' in FIG. 5.

In the expanded position, expanded performance surface 98 of expandable shelf 28 is prepared to receive ORFF instruments arranged for a performance. In addition, positioning lower expandable shelf 28 in the expanded performance configuration completes the steps necessary to expose upper fixed shelf 30 to its performance configuration. ORFF instruments initially stored on upper fixed shelf 30 are now accessible to musicians. Upper fixed shelf 30 serves a dual purpose providing for storage of ORFF instruments when cart 20 is in the folded storage configuration and performance with ORFF instruments when cart 20 is in the expanded performance configuration.

Portable cart 20 changes from providing three storage shelves in the folded storage configuration to providing three performance shelves in the expanded performance configuration. Portable cart 20 is able to store the same number of ORFF instruments as it can present for a performance. Portable cart 20 provides institutions of education and music a useful and convenient means for storing and transporting ORFF instruments conveniently and easily, supporting group performances with the same ORFF instruments while using a minimum of space.

We claim:

1. A portable cart for supporting and transporting musical instruments over a floor comprising:
   a frame including a base frame presenting first and second opposed ends and first and second upright standards operably, fixedly coupled to said opposed ends;

a floor engaging wheel assembly operably coupled to said base frame such that said base frame is rollably carried on said wheel assembly for transport across said floor;

a first expandable shelf assembly operably pivotally coupled to said first upright standard and including a first expandable shelf having a storage surface and a performance surface each adapted for supporting said instruments, said first expandable shelf assembly being shiftable between a folded position wherein said first expandable shelf storage surface is upwardly presented and an expanded position wherein said first expandable shelf performance surface is upwardly presented; and a second expandable shelf assembly operably pivotally coupled to said second upright standard and including a second expandable shelf having a storage surface and a performance surface each adapted for supporting said instruments, said second expandable shelf assembly being shiftable between a folded position wherein said second expandable shelf storage surface is upwardly presented and an expanded position wherein said second expandable shelf performance surface is upwardly presented, said first and second upright standards presenting respective top ends, said first upright standard top end being higher than said second upright standard top end, said first expandable shelf overlapping said second expandable shelf when said first and second expandable shelves are in the respective folded positions.

2. The invention as claimed in claim 1, said first expandable shelf assembly and said second expandable shelf assembly each including a generally U-shaped expandable shelf support leg, said support legs being operably pivotally coupled to said first and second expandable shelves respectively, said support legs being engageable with said floor when said first and second expandable shelf assemblies are in the expanded positions, and said support legs being adapted for hand graspable maneuvering of said portable cart when said first and second expandable shelf assemblies are in the folded positions.

3. A portable cart as claimed in claim 1 wherein said performance surfaces are at different heights above the floor when said shelf assemblies are in the expanded position.

4. A portable cart as claimed in claim 1 further including:

a first four bar mechanism shiftable between a folded position and an expanded position and supporting the first expandable position and supporting the first expandable shelf assembly when in the expanded position;

a second four bar mechanism shiftable between a folded position and an expanded position and supporting the second expandable shelf assembly when in the expanded position;

the first and second four bar mechanisms each comprising a vertical standard having a top and bottom end margin, a standard extension being operably shiftably coupled to the top margin of the vertical standard, a tie bar having a first and second end, the first end being operably, shiftably coupled to the vertical standard proximate the bottom end margins thereof, a support leg being operably shiftably coupled to the expandable shelf assembly and to the second end of the tie bar.

5. A portable cart as claimed in claim 4, wherein the first and second four bar mechanisms are shiftable between the folded position and the expanded position by exertion of a single continuous motion on the support leg comprising a raising, outwardly rotational and lowering path of motion.

6. A portable cart as claimed in claim 4, further including a plurality of instrument holders being affixed to the upright standards and having an upwardly directed mouth adapted for the receiving of musical instruments therein.

* * * * *